UNITED STATES PATENT OFFICE.

HERBERT T. KALMUS, WALTER L. SAVELL, AND KENNETH B. BLAKE, OF KINGSTON, ONTARIO, CANADA, ASSIGNORS, BY DIRECT AND MESNE ASSIGNMENTS, TO THE EXOLON COMPANY, OF CAMBRIDGE, MASSACHUSETTS, A CORPORATION OF MASSACHUSETTS.

METHOD OF MAKING ALUMINA.

1,148,092.  Specification of Letters Patent.  Patented July 27, 1915.

No Drawing.  Application filed March 21, 1914.  Serial No. 826,458.

*To all whom it may concern:*

Be it known that we, HERBERT T. KALMUS, WALTER L. SAVELL, and KENNETH B. BLAKE, citizens of the United States, all residing at Kingston, in the county of Frontenac, Province of Ontario, and Dominion of Canada, have invented certain new and useful Improvements in Methods of Making Alumina; and we do hereby declare the following to be a full, clear, and exact description of the invention, such as will enable others skilled in the art to which it appertains to make and use the same.

The present invention relates to a method of obtaining alumina from sulfitable aluminous and silicious materials and more particularly to a method of obtaining alumina from nephelin syenite.

The object of the method is the economical production of alumina, and more especially a cheap crude alumina suitable for use in making abrasives.

The present invention is particularly directed to improving the method of making alumina described in the application of Kalmus and Savell, Serial No. 773,734, filed June 14, 1913, and adapting it to the economical production of alumina on a commercial scale.

The method of the present invention will first be briefly outlined and then described in detail.

According to the present method, the material or ore to be treated, which contains compounds of both aluminium and silicon, is first ground or pulverized. The pulverized material is then subjected to a sulfiting operation by the action of sulfur dioxid and water by means of which an aqueous solution is formed of a large fraction of the alumina in the ore and more or less of the silica. The sulfited or digested mass is then partially desulfited to precipitate all or nearly all of the dissolved silica. The solution, which contains the dissolved alumina, is separated from the precipitated silica and any insoluble residue which was not dissolved during the sulfiting operation. The solution is then further desulfited until alumina is precipitated. The precipitated alumina, which is the sought-for product, is separated from the solution and dried.

The method will now be described in detail as it has been practised to obtain alumina from nephelin syenite which has been found to be readily sulfitable by the present process.

The rock or ore, nephelin syenite, is first ground to a fine powder. The pulverized rock or ore is then subjected to a sulfiting operation by the action of sulfur dioxid and water as follows: The pulverized rock or ore is put into a closed tank or digester and covered with from five to ten times its weight of an approximately two per cent. (2%) water solution of sulfur dioxid. While it is preferred to mix the rock or ore with a solution of sulfur dioxid, nevertheless, the rock or ore may be first mixed with water, and sulfur dioxid may be then introduced into the digester to form sulfurous acid with the water in the digester.

The expression "sulfur dioxid and water", as used in the specification and claims, is intended to include any compound or mixture of sulfur dioxid ($SO_2$) and water ($H_2O$) whether or not in the compound expressed by the formula $H_2SO_3$ (sulfurous acid) and whether or not accompanied by small percentages of other compounds of sulfur.

The treatment in the digester is carried on at ordinary room temperatures. During the treatment the mass is agitated to mix the rock or ore and solution and to assist the chemical reactions. Sulfur dioxid gas, which is recovered from subsequent operations, is introduced into the digester and the sulfiting or digesting operation is carried on until substantially all of the soluble alumina content is dissolved and the mass contains an excess of the sulfur dioxid.

The nephelin syenite contains alumina, silica, oxids of iron, sodium and potassium and the like. The sulfur dioxid converts a large part of the alumina content of the rock or ore into a complex unstable soluble compound or compounds containing aluminium oxid and sulfur dioxid having the general nature of aluminium bisulfite. The sulfur dioxid converts a part of the other compounds, such as oxids of sodium, potassium, iron and the like, as found in this rock or ore, in so far as they react at all, into relatively stable compounds containing sulfur dioxid of the general nature of sulfites and bisulfites.

A considerable portion of the silica goes into solution. This silica solution is believed to be partially a true solution and partially what may aptly be called a colloidal solution and perhaps partially silica in a finely divided condition of suspension, so where in the specification and claims the expression "silica solution" or the like is used, it is to be understood as including not only silica, silica hydrate, hydrated silica and silicic acid which exist in true solution, but also any silicious compound or compounds existing in a colloidal state or in a difficultly filterable state of suspension, in short, a mixture or solution of silica and water inseparable or difficultly separable by filtration. At the end of the sulfiting treatment a large portion of the rock or ore has been dissolved, leaving an insoluble residue which is largely composed of silica and of undecomposed rock or ore. This unfiltered mass of digester liquor containing all the insoluble residue is next partially desulfited by heating it, preferably to about 55° centigrade, although this temperature may be varied, if desired. The solution is preferably agitated during the heating to assist the desulfiting. The solution is preferably heated by the introduction of steam and is preferably agitated by mechanical means, such as paddles. The desulfiting is carried on until all or nearly all of the dissolved silica in the solution is precipitated. The silica which went into solution during the sulfiting treatment was held in solution in an unstable manner in the presence of an excess of sulfur dioxid in the solution. The action of the heat and agitation on the solution is to drive off the excess of sulfur dioxid gas and to cause precipitation of the dissolved silica from the solution.

The term "silica", as used in the specification and claims, is intended to include silica ($SiO_2$), silica hydrate, hydrated silica, silicic acid and like compounds of silicon.

The sulfur dioxid gas driven off by this operation is removed by suitable gas pumps and sent back to the digesters for use in treating another batch of ore.

If the amount of sulfur dioxid solution or water which was mixed with the ore before the sulfiting treatment in the digester was less than ten times the weight of the pulverized ore, sufficient water is added, prior to desulfiting the mass, to bring the total amount of water up to about ten times the weight of the original amount of pulverized ore, so that the total weight of the sulfited mass prior to desulfiting, is approximately twelve times that of the weight of the pulverized ore, the weight of the sulfur dioxid absorbed being about equal to that of the ore. While this ratio of water to ore may be considerably varied, this particular ratio is preferred, because it gives a mixture which, after the precipitation of the silica, is of readily filterable fluidity. This desulfiting operation is carried on until the silica is completely or nearly completely precipitated, but is discontinued before any considerable amount of alumina is precipitated. The mass is now in such condition that the solution can be readily separated by filtration from the solids, which consist of the precipitated silica and the original insoluble residue. The solution is next separated from the solids by filtration, as by means of filter presses. The filtered solution is next further desulfited to precipitate the alumina. This further desulfiting is carried out by heating the solution to a temperature of approximately 80° centigrade and preferably subjecting it to moderate agitation. Temperatures between 75° centigrade and the boiling temperature, have been used for this alumina precipitation. The solution is preferably heated by the introduction of steam and is preferably agitated by stirring with mechanical means, such as paddles. The result of this treatment is to precipitate alumina and cause the evolution of sulfur dioxid gas from the solution. Here also the sulfur dioxid gas is drawn off by means of suitable gas pumps and used for treating another batch of ore in the digesters.

The alumina is precipitated as a compound containing aluminium oxid or aluminium hydrate and a small amount of sulfur dioxid, and having the general nature of a basic aluminium sulfite. The presence of a small amount of sulfur dioxid in the precipitate is a distinct advantage in that it causes the precipitate to be of a crystalline or granular character which settles readily and may be easily separated by filtration, whereas pure aluminium hydrate is a substance which can be filtered only with the greatest difficulty. The precipitated alumina usually carries with it a small amount of silica which was not precipitated during the first desulfiting operation when the greater part of the silica was precipitated. This silica which is present in the precipitated alumina may be anything from a trace to ten per cent. (10%) depending upon the nature of the ore and upon the care with which the first desulfiting operation was carried out. For many purposes, such as for the preparation of certain abrasives, this small amount of silica is not harmful but may be advantageous.

As above pointed out, the alumina, as precipitated from the solution, may contain a certain amount of combined sulfur dioxid, and may, in addition, contain a small amount of silica. The term "alumina," as used in the specification and claims, is therefore not intended to imply that this precipitate is necessarily of pure alumina, but is intended to include within its purview alumina sufficiently pure for commercial purposes but which may also contain some impurities.

The precipitated alumina is separated from the solution by filtration, as by means of filter presses, and dried. The relatively stable compounds of sodium, potassium, iron and the like which were brought into solution during the sulfiting operation, still remain in the solution which is filtered from the precipitated alumina. The alumina thus obtained is preferably dried and calcined. When a considerable amount of the combined sulfur dioxid is present, the calcining drives off the sulfur content.

In carrying out the present method, certain economies are practised. One of the important economies relates to the re-use of the sulfur dioxid gas recovered during the desulfiting operations. It will be remembered that the sulfur dioxid gas evolved during the desulfiting operations in which the silica and the alumina, respectively, were precipitated, was removed from the containers and piped back for use in treating a fresh batch of ore in the digesters. This sulfur dioxid gas which is recovered and is evolved for re-use amounts to from about seventy to ninety-five per cent. (70 to 95%) of the total sulfur dioxid gas which was used for treating the batch of ore during the sulfiting operation, leaving from about five to thirty per cent. (5 to 30%) sulfur dioxid gas which cannot be recovered. Therefore a certain amount of new sulfur dioxid must be introduced into the digesters for the treatment of a fresh batch of ore, in addition to that recovered from the previous run. This five to thirty per cent. (5 to 30%) of sulfur dioxid is preferably introduced by means of the sulfur dioxid solution with which the ore is first mixed. It is found in practice that a two per cent. (2%) sulfur dioxid solution of between five and ten times the weight of the pulverized ore is usually sufficient to furnish the needed amount of sulfur dioxid gas which has to be replaced at each run because of the failure to recover all of the sulfur dioxid from the previous run. While it is preferred to thus supply the added sulfur dioxid by means of a sulfur dioxid solution, nevertheless, it might be supplied by passing the sulfur dioxid and nitrogen from any of the usual forms of sulfur burners into the digesters until the needed amount of sulfur dioxid is absorbed. This latter method, while practicable, is not preferred, as there would be an undue amount of agitation due to the introduction of the inert nitrogen. The sulfur dioxid gas which is recovered during the desulfiting operation is substantially pure and is in a condition to be advantageously introduced into the digesters.

It will be noted that after the sulfiting or digesting operation the digester liquor contains both alumina and silica in solution. The alumina and silica in solution are separated from each other by a process of fractional desulfiting. That is, in order to precipitate the silica, and at the same time retain the alumina in the solution, the solution is deprived of only that fractional part or excess of the total sulfur dioxid which served to hold the silica in solution, and sufficient sulfur dioxid is allowed to remain to maintain the alumina in its dissolved state. On the other hand, if the solution containing the silica were to be completely or nearly completely desulfited at a single operation, there would be no separation of silica and alumina: silica would first be precipitated; during the last stages of the silica precipitation alumina would begin to be precipitated; and then the alumina precipitation would continue until the alumina was precipitated. The last stages of the silica precipitation would overlap or coincide with the first stages of the alumina precipitation, there being no distinct line of demarcation between the silica precipitation and the alumina precipitation. The first precipitate would consist of substantially all silica, and then, as the end of the silica precipitation was approached, the precipitate would consist of a mixture of silica and alumina, becoming poorer in silica and richer in alumina, until the precipitate would consist of substantially all alumina which would continue to be thrown down until substantially all of the alumina was precipitated from the solution. While, as above pointed out, there is no distinct line of demarcation between the end of the silica precipitation and the beginning of the alumina precipitation, nevertheless, by the method of the present invention the silica and alumina are separated and alumina sufficiently pure for making abrasives is obtained. This is done by discontinuing the sulfiting operation after most of the silica has been precipitated and before any considerable amount of alumina is precipitated. Consequently, the solution which is filtered from the precipitated silica and insoluble residue, contains practically all of the alumina together with traces of silica which was not precipitated.

We have discovered that by carefully controlling the concentration and temperature as herein described, and by stopping the partial desulfiting at just the right time, an alumina may be obtained which carries with it only very small quantities, if any, of silica. The subsequent desulfiting of this filtrate deprives the solution of that part of the then contained sulfur dioxid which served to hold the unstable compounds of alumina and sulfur dioxid in solution and causes the precipitation of the alumina together with the accompanying traces of silica. The amount of silica which is precipitated with the alumina is not sufficient to impair its value for making abrasives. The amount of silica which is precipitated with the alumina can be controlled by properly selecting the point at which the desulfiting operation which precipitates the silica is discontinued. For example, if the desulfiting operation is discontinued as soon as the initial precipitation of the alumina commences, more silica will remain in the solution to be later precipitated with the alumina. On the other hand, if the desulfiting operation is not discontinued until after the precipitation of the alumina has progressed to that stage at which the precipitate then being thrown down is substantially all alumina, the alumina obtained as the final product will contain only slight traces of silica. After the desulfiting operation is finished and the alumina is precipitated, the solution still contains some residual sulfur dioxid, principally in the form of relatively stable sulfites or bisulfites of sodium, potassium, iron and the like.

The digester liquor as obtained at the completion of the sulfiting operation is a slimy silicious mass which can only be filtered with great difficulty. It is believed that the difficult filterability is due to the colloidal character of the silica. According to the method of the present invention, no attempt is made to filter the digester liquor until after it is fractionally desulfited to precipitate the dissolved silica. After the silica is transformed from its dissolved state into a precipitated state by the process of fractional desulfiting, the digester liquor is in a condition which permits of comparatively easy filtration to separate the solution which contains the alumina, from the solids which consist of the precipitated silica together with the original insoluble residue. The process of partially desulfiting the digester liquor in order that it may be brought into a condition for easy filtration before an attempt is made to filter it, is of great importance in economically carrying out the process.

This invention is not limited to the details of the method hereinbefore described, but is defined by the following claims.

We claim—

1. The method of making alumina which consists in subjecting aluminous and silicious materials to a sulfiting operation by the action of sulfur dioxid and water to transform alumina content into a relatively unstable compound or compounds of alumina and sulfur dioxid with which is present some silica in solution in an unstable condition, in partially desulfiting the solution to precipitate silica, in separating the solution from the solids, in further desulfiting the solution to break down the unstable compound or compounds of alumina and sulfur dioxid and precipitate alumina from the solution, and in separating the precipitated alumina from the solution, substantially as described.

2. The method of making alumina which consists in subjecting sulfitable aluminous and silicious materials to a sulfiting operation by the action of sulfur dioxid and water to transform alumina content into a relatively unstable soluble compound or compounds of alumina and sulfur dioxid with which is present some silica in solution in an unstable condition, in partially desulfiting the solution by heating it to precipitate silica, in separating the solution from the solids, in further desulfiting the solution by heating it to break down the unstable compound or compounds of alumina and sulfur dioxid and precipitate alumina from the solution, and in separating the precipitated alumina from the solution, substantially as described.

3. The method of making alumina which consists in subjecting sulfitable aluminous and silicious materials to a sulfiting operation by the action of sulfur dioxid and water to transform alumina content into a relatively unstable soluble compound or compounds of alumina and sulfur dioxid with which is present some silica in solution in an unstable condition, in partially desulfiting the solution by heat and agitation to precipitate silica, in separating the solution from the solids, in further desulfiting the solution by heat and agitation to break down the unstable compound or compounds of alumina and sulfur dioxid and precipitate alumina from the solution, and in separating the precipitated alumina from the solution, substantially as described.

4. The method of making alumina which consists in subjecting sulfitable aluminous and silicious materials to a sulfiting operation by the action of sulfur dioxid and water to transform alumina content into a relatively unstable soluble compound or compounds of alumina and sulfur dioxid with which is present some silica in solution in an unstable condition, in partially desulfiting the solution by heating it to about 55° centigrade with agitation to precipitate silica, in separating the solution from the solids, in further desulfiting the solution by heating it to about 80° centigrade with agitation to break down the unstable compound or compounds of alumina and sulfur dioxid and precipitate alumina from the solution, and in separating the precipitated alumina from the solution, substantially as described.

5. The method of making alumina which consists in subjecting sulfitable aluminous and silicious materials to a sulfiting operation by the action of sulfur dioxid and water to transform alumina content into a relatively unstable soluble compound or compounds of alumina and sulfur dioxid with which is present some silica in solution in an unstable condition, in separating the silica in solution in an unstable condition, in separating the silica and alumina by a process of fractionally desulfiting the solution in order to precipitate first the silica and then the alumina, and in separately separating the precipitated silica and alumina, respectively, from the solution, substantially as described.

6. The method of making alumina which consists in subjecting sulfitable aluminous and silicious materials to a sulfiting operation by means of which alumina and silica content are rendered soluble and are brought into an aqueous solution, in separating the silica and alumina by a process of fractionally desulfiting the solution in order to precipitate first the silica and then the alumina, and in separating the precipitated silica and alumina from the solution.

HERBERT T. KALMUS.
WALTER L. SAVELL.
KENNETH B. BLAKE.

Witnesses:
GEO. H. SMYTHE,
ANNIE M. McCAMMON.

It is hereby certified that in Letters Patent No. 1,148,092, granted July 27, 1915, upon the application of Herbert T. Kalmus, Walter L. Savell, and Kenneth B. Blake, of Kingston, Ontario, Canada, for an improvement in "Methods of Making Alumina," an error appears in the printed specification requiring correction as follows: Page 5, lines 16–17, strike out the words "in separating the silica in solution in an unstable condition;" and that the said Letters Patent should be read with this correction therein that the same may conform to the record of the case in the Patent Office.

Signed and sealed this 5th day of October, A. D., 1915.

[SEAL.]
R. F. WHITEHEAD,
*Acting Commissioner of Patents.*